Sept. 29, 1964                D. SILVERMAN                3,150,590
                           EXPLOSIVE CHARGE UNIT
Filed Oct. 20, 1961                                  4 Sheets-Sheet 3

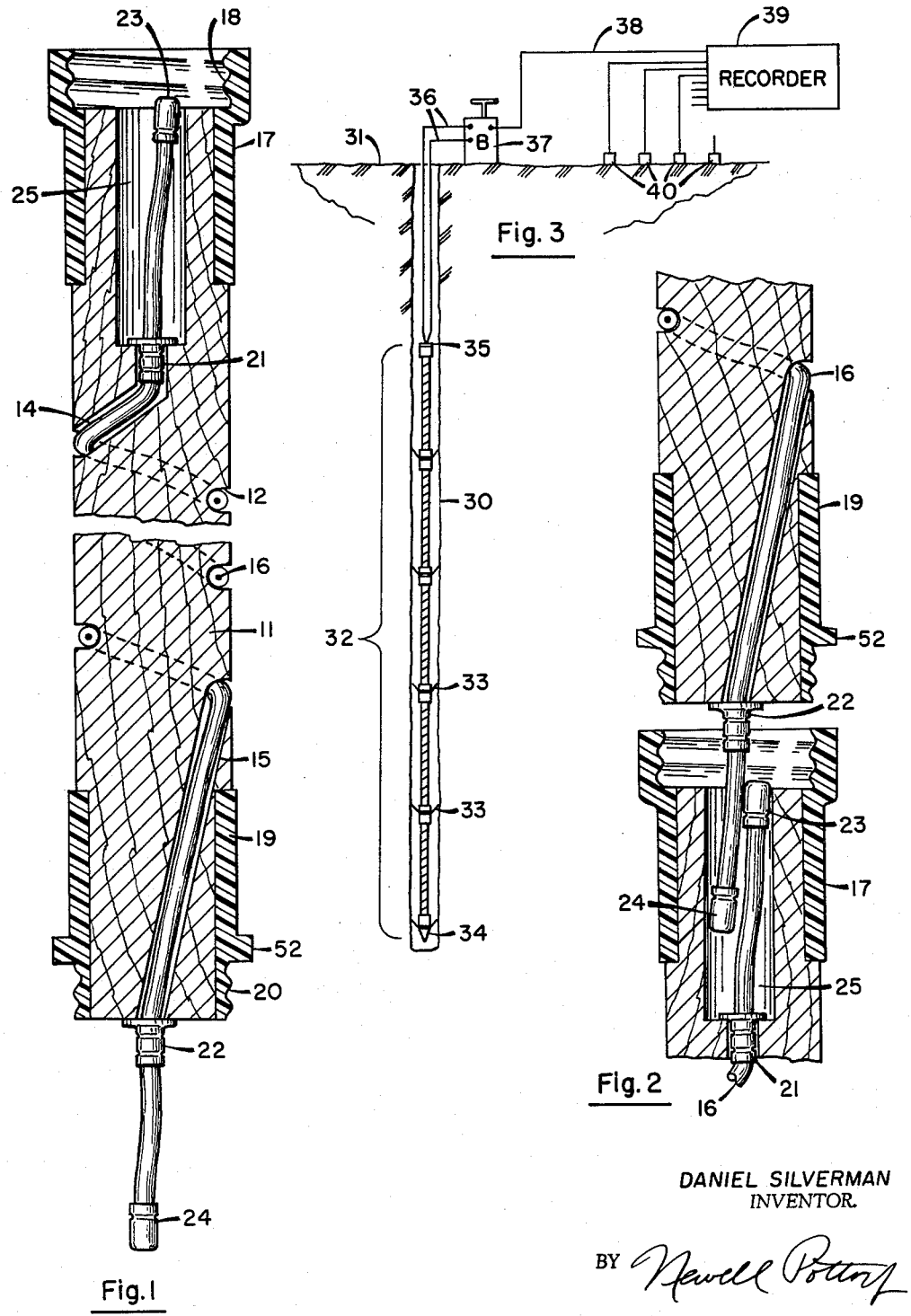

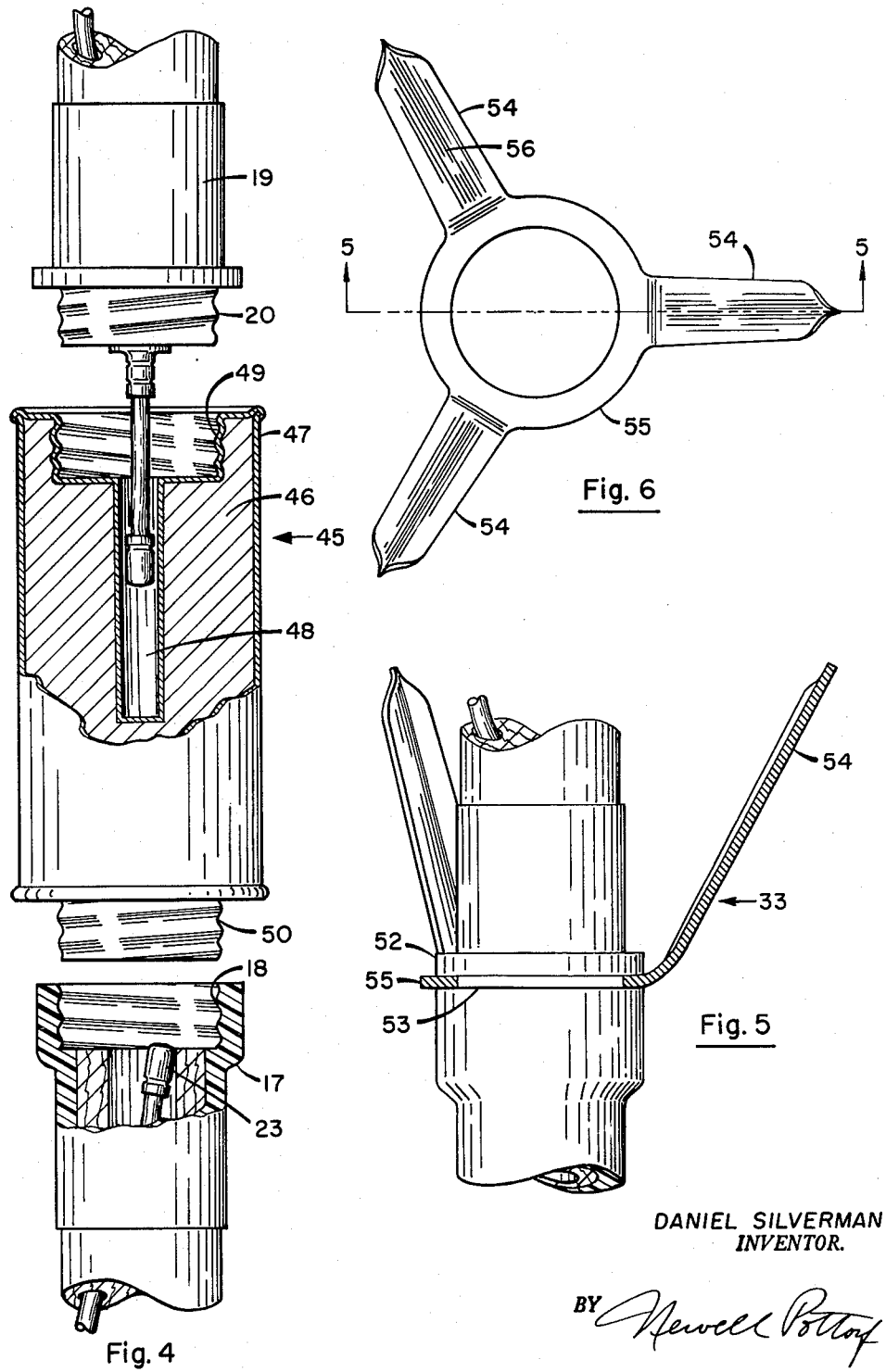

DANIEL SILVERMAN
INVENTOR.

BY Newell Pottoff

ATTORNEY

Sept. 29, 1964    D. SILVERMAN    3,150,590
EXPLOSIVE CHARGE UNIT

Filed Oct. 20, 1961    4 Sheets-Sheet 4

DANIEL SILVERMAN
INVENTOR.

BY Newell Potts
ATTORNEY

United States Patent Office 3,150,590
Patented Sept. 29, 1964

3,150,590
EXPLOSIVE CHARGE UNIT
Daniel Silverman, Tulsa, Okla., assignor to Pan American Petroleum Corporation, Tulsa, Okla., a corporation of Delaware
Filed Oct. 20, 1961, Ser. No. 146,490
2 Claims. (Cl. 102—21.6)

This invention relates to seismic geophysical surveying, and is directed particularly to an improved seismic-velocity-matching explosive-charge unit particularly useful in constructing elongated, distributed explosive charges for generating seismic waves. The term "velocity-matching," as used herein, is to be understood as including not only substantial or approximate equality of the seismic-wave and the charge-detonation velocities, but also the intended choosing or adjustment of detonation velocities to be greater or less than the seismic velocities by definite amounts or factors.

In seismic geophysical surveying, wherein artificial seismic waves are created by denoating an explosive charge in the earth, and the resulting waves are received by seismometers variously disposed on the earth's surface, it has become generally recognized that an elongated continuous explosive charge, or an array of point charges properly spaced and with their detonations in proper time sequence such as to match the advancing of a seismic wave front through the adjacent earth medium, offers substantial advantages. Such elongated charges or arrays have directional properties, in that the created seismic waves travel in a preferred direction with maximum strength, and at the same time cause less unwanted disturbances traveling in other than the desired directions.

Offsetting these desired properties to some extent is the fact that such charges are comparatively expensive to construct and use. Although several different ways of constructing elongated distributed charges or velocity-matching arrays have been proposed, only two types of seismic-velocity-matching charge arrangements are in general use at the present time. One of these is a continuous charge consisting essentially of a multiplicity of sticks of low-detonation-velocity dynamite which are placed in end-to-end contact and encased in a plastic tube for protection against water, which would otherwise prevent detonation of the dynamite medium. A second type of assembly consists of delay units formed of lengths of cardboard tube containing low-energy detonating cord. Concentrated explosive charges are coupled together by these delay units into an elongated array of the desired length and effective velocity.

A principal difficulty with the continuous charge is that it can only be manufactured and used in rather large total weights of explosive, for the reason that the low-detonation-velocity dynamite does not detonate reliably when the cross-sectional area of the dynamite column is too small. As is well known, the use of excessively large charges of dynamite frequently results in the creation of unnecessary and undesirably large amounts of extraneous seismic noise, and prevents the generation of high-frequency signals in the earth which are required for many problems. A further disadvantage of the continuous charge is that it cannot be pushed down to a desired depth in a shot-hole by poles from the ground surfaces, but can be only inserted into the hole by pulling downward such as by means of a weight tied to the bottom of the charge. As the weights are normally not recoverable, and furthermore cannot be forced through narrow or caved places in the shot-hole, the utility of the continuous charge is further limited thereby.

The disadvantages of the delay units for coupling spaced explosive charges into an array are that the units themselves are relatively high in cost, and when detonated, the cardboard tubes do not completely disintegrate, but leave substantial amounts of non-fragmented debris in the shot-hole, which debris frequently prevents placing subsequent charges in the same hole without expensive cleaning-out or redrilling. Lacking any substantial explosive power, the delay units are useless if used alone, without the added charges. Although the array formed of delay units and concentrated charges may be loaded into a shot-hole by means of poles, the use of spaced charges is less efficient and desirable than a continuous distribution of explosive. Furthermore, the spaced charge array does not conveniently lend itself to making very small-weight charges.

In view of the foregoing, it is a primary object of my invention to provide a novel explosive charge unit which overcomes substantially all of the noted disadvantages of both the continuous explosive charge of low-detonation-velocity material and of the array of discrete, spaced lump-charges joined by delay connectors. More specifically, it is an object of my invention to provide an explosive unit which can be used to form an elongated, rigid, continuous explosive charge capable of being loaded into a shot-hole by loading poles, which upon shooting disintegrates into fragments which do not block the shot-hole against subsequent charge loading, which is accurate as to the matching of seismic and charge-detonation velocities, and which is available in quite small total weights of explosive. A still further object of my invention is to provide such a charge unit of a convenient length both for storage and transportation, as well as for assembly at the time of use into an elongated array, which unit is virtually unlimited as to total explosive weight in an array, being adapted for use either by itself or with commercially available explosive units, and where, either alone or with added explosive units, the act of connecting together the units of the invention automatically provides for the propagation of detonation from one unit to the next. A still further object is to provide such an explosive unit which is useful for "sleeper" charges: that is, charges which are loaded into a shot-hole where they remain submerged under water for substantial periods of time before use, which units further provide a convenient accommodation for hold-down anchor devices to maintain them in firing position. Other and further objects, uses, and advantages of the invention will become apparent as the description proceeds.

Briefly stated, the foregoing and other objects are accomplished in accordance with my invention by an explosive unit comprising a fragmentable rod or pole of convenient length for handling, having a helical groove cut into the pole surface and extending for the greater part of the pole length, in which groove is placed a helix of detonating cord of high and constant velocity and substantial explosive power such as the cord sold commercially as "Primacord." The unit is provided with coupling elements at the two ends of the pole for coupling with adjacent units into an elongated array. The pitch of the helical groove is chosen so that the effective detonation velocity of the "Primacord" helix in the direction of its axis matches the seismic-wave-transmission velocity of subsurface formations in which the charge is detonated. The "Primacord" and end couplings are also preferably so formed and arranged that the act of coupling together two such units or making connections to commercially available canned explosive charges automatically insures propagation of the detonation across the coupling.

This will be better understood by reference to the accompanying drawings showing typical and preferred embodiments of the invention and various ways in which it can be adapted for use in different conditions. In the drawings, FIGURE 1 is a longitudinal cross-section view of an explosive unit embodying the preferred form of the invention;

FIGURE 2 is a cross-section view of the ends of two such units showing how they fit together;

FIGURE 3 is a diagrammatic cross-section view of a shot-hole drilled below the earth's surface, with an elongated charge embodying the invention positioned therein for seismic prospecting purposes;

FIGURE 4 is an elevation view, with certain parts in cross-section, showing the use of the invention with commercial explosive units;

FIGURES 5 and 6 are respectively elevation and plan views showing an anchor unit adapted for use with the connectors of the invention;

Figure 7:
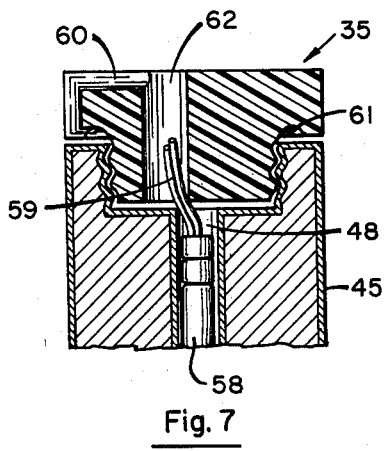
FIGURE 7 is a cross-section view of an explosive cap-holding device.

Referring now to the drawings in detail, and particularly to FIGURE 1 thereof, the explosive unit of the present invention comprises an elongated rod or pole 11 preferably of fragmentable, rigid, and inexpensive but strong material such as wood, into the surface of which has been formed by cutting or the like a helical groove 12. The length of pole 11 is preferably such as to be both readily handled, stored and transported, and also adaptable to be rapidly assembled into an elongated explosive charge. While a length of five feet for the pole 11 has been found quite convenient and satisfactory, it is to be understood that shorter or greater lengths may be used if desired for any particular reason. The helical groove 12 extends continuously throughout the central portion of the rod or pole 11 to near the ends of the pole where, by slanted holes 14 and 15, openings are provided from the groove inwardly to the axis of the pole 11. Extending through the holes 14 and 15 and continuously along the groove 12 from end to end of the pole 11 is a length of high-detonation-velocity detonating cord 16 of the type commercially known as "Primacord." Secured to one end of the pole 11 and preferably formed of molded plastic or the like is a female connector 17, having internal threads 18, while similarly connected or attached to the other end of pole 11 is a male connector 19 also preferably of molded plastic and having external threads 20. The cord 16 is maintained in position by flanged metal collars 21 and 22 which are secured to the cord 16 by crimping or the like, while the ends of the cord are protected against entrance of moisture by metal caps 23 and 24 likewise secured in position by crimping or the like.

Formed within one or both ends of the pole 11, preferably within and coaxial with the female connector 17, is a cylindrical chamber 25 of slightly more than two times the diameter of the cap 23. Thus, as appears in the drawing, the flange of collar 21 seats on the shoulder formed by slanted hole 14 at the bottom of chamber 25, leaving an end portion of the cord 16 free and upstanding. A similar length of the cord 16 projects beyond the end of the pole 11 carrying the male connector 19.

The purpose of the chamber 25 and this arrangement of the two ends of the cord 16 will be clear upon reference to FIGURE 2, which shows in cross-section the male connector 19 of one unit just before being joined to the female connector 17 of a next lower unit. As is apparent in this figure, the chamber 25 brings the two free ends of the cord 16 beyond the anchoring collars 21 and 22 into close side-by-side contact with each other. The diameter of the chamber should be as small as can satisfactorily admit the two lengths of Primacord, since the confinement imposed by the walls of the cavity assists in the cross detonation from one end of cord to the other. Propagation of the detonation from one cord to the other is thus insured with a high degree of certainty, simply upon screwing together the threads 18 and 20 in the obvious manner.

In FIGURE 3 is shown diagrammatically in cross-section an earth shot-hole 30 with an elongated charge made up of a plurality of such units connected together end to end and placed in the shot-hole, which extends to some distance below the ground surface 31. This is a typical seismic geophysical surveying set-up in which the units form an elongated charge array 32, provided with hold-down anchoring devices 33 at one or more of the unit junctions, a bottom-protecting point 34, and a detonating-cap holder 35 at the top end of the array 32. Conventionally, electrical firing leads 36 extend from a cap in holder 35 to a blaster 37 at the ground surface for applying detonating current to the cap, at the same time transmitting over a lead 38 connected to a recorder 39 an indication of the instant of detonation of the cap 35. Also connected to the recorder 39 are a plurality of seismometers 40 which detect the arrival of the resulting seismic waves at the ground surface 31.

As will be apparent to those skilled in the art, geophysical operations are carried out by actuating the blaster 37 to detonate cap 35, and thereafter the explosive detonation propagates along the length of charge 32 toward the bottom thereof with a velocity substantially matching the seismic wave velocity of the surrounding borehole formations, as is determined by the pole diameter and the pitch of the helical groove 12 containing the detonating cord 16. A record of the resulting seismic waves as received by detectors 40 is made by the recorder 39 in a well-known manner.

It will be apparent that as far as the unit of FIGURE 1 is concerned, it is entirely optional whether the chamber 25 is formed in the female-connector end of the rod or pole 11 as shown, or whether it is formed wholly or in part within the male connector 19. It is required only that there be provided sufficient space for the confinement of the projecting portions of the cord 16 so they will overlap side-by-side to some extent, in order to insure reliable propagation of the detonation.

As will be clear from FIGURE 4, however, it is preferred that the chamber 25 be provided within the female connector 17 as shown and that the portion of the cord 16 anchored by sleeve 22 project from the male-connector end of the pole 11. This permits the use, as is illustrated in FIGURE 4, of commercially available canned explosives such as the unit 45, which consists essentially of a sheet metal can 47 filled by an explosive material 46 and containing a central well 48 into which may be inserted a detonating cap to detonate the explosive 46. The central well 48 opens into the end of the can containing the female threads 49 with which the male threads 20 of the present connector 19 are adapted to mate. Likewise, the female threads 18 of the connector 17 of the invention are adapted to mate with the male threads 50 of the commercially available canned explosives.

As is clearly apparent in FIGURE 4, the projecting portion of the cord 16 extends into the well 48 when the connection is made to the top of can 45, while screwing together the threads 50 and 18 brings the bottom end of can 45 into contact with the cap 23 on the upper end of cord 16. In both cases detonation propagates reliably between the cord and the explosive in the can.

It is apparent also that by this arrangement, any desired weight of explosive whatever can be incorporated in the total charge 32, from the minimum that is provided by the detonating cord 16 alone to any additional amount that is desired, by coupling between the units 11 any desired number of canned explosive units 45. In all cases, merely connecting the units into a continuous assembly automatically provides the proper conditions for propagating the detonation.

For loading in water-filled bore-holes, it is desirable that one or more anchor members 33 be present to counteract the buoyancy of charge 32 and prevent it from rising toward the ground surface. As is shown in the drawings, the male connector 19 is preferably provided with an enlargement or flange 52 immediately adjacent the threads 20. As is best shown in FIGURE 5, this cooperates with the end of female connector 17 to provide an annular groove 53 for holding an anchor member 33, which may consist of a ring 55 preferably stamped from sheet metal, from which ring extend radially a plurality of spikes or pointed members 54 adapted to be bent upwardly at an angle for engaging the bore-hole wall. Preferably, in the course of manufacturing the unit 33 by stamping or the like, there is formed a longitudinal rib 56 in each spike 54 to strengthen it against bending. Accordingly, flexing or bending of the pointed members occurs only close to the base of the spikes 54 where they join the ring 55. Of course, it is possible to restrain the poles from floating to the surface by attachment of a weight.

In FIGURE 7 are shown details of the cap holder 35, which forms no part of the present invention but is usable therewith in the manner shown in the figure, where a cap 58 is retained in place within the well 48 of a canned explosive unit 45. Thus, the cap retainer 35 comprises a plastic body provided with male threads and an eccentric hole 62 through which the cap 58 may be inserted into the well 48. Due to the off-center position of passage 62 relative to well 48, cap 58 cannot be withdrawn from well 48 once the units are screwed together. There is, however, room for passage of the cap leads 59 upward through the channel 62 and thence through a channel 60 to a position 61 underneath the edge of cap 35, so that by making one or two turns of the cap wire around the unit 35 in the channel 61 and subsequently tightening down of the cap holder 35, the assembly is securely attached to the cap wire 59.

It will be understood that the canned explosive unit 45 is not necessary to the initiation of an elongated charge array formed in accordance with the invention. The cap 58 may simply be inserted into the chamber 25 of a pole unit 11 alongside the upstanding end of cord 16 and held therein by screwing holder 35 into the female connector 17. Detonation is then propagated directly to the cord 16.

Figure 8:
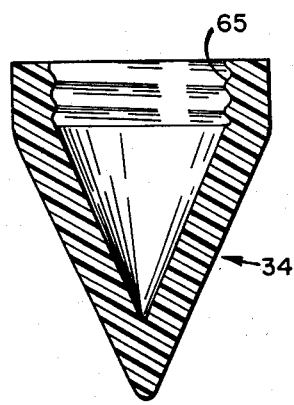
FIGURE 8 is a cross-section view of a bottom-protecting point usable with the invention.

As is shown in FIGURE 8, the bottom protector 34 simply comprises a pointed hollow plastic member provided with female threads 65 for engagement either with the male threads 50 of a canned explosive unit 45 or with the threads 20 of one of the pole units 11 of the present invention.

The nature of the material of which the rod or pole 11 is composed appears to be a matter of substantial importance. As the unit is normally destroyed in the course of usage, it is important that the material should be relatively inexpensive and should form relatively small fragments so that the debris from its destruction does not block the shot-hole and prevent introduction of subsequent charges. In order that the amount of this debris should be as small as possible, the pole diameter should be a minimum. Buoyancy is also desirable, as in practice it is found that subsequent charges can be easily pushed down through a mass of floating chips, which would almost certainly form a solid bridge if they were non-buoyant.

Furthermore, it appears to be of importance that the successive turns of the cord 16 forming the helix should be physically shielded from each other by an appreciable thickness of material of substantial strength. This function is performed by the ridges remaining when a helical groove is cut into the surface of the pole to a depth of the order of the diameter of cord 16. For the rod or pole material, wood has proven to be quite satisfactory.

By way of example but not of limitation, the following are presented as typical characteristics which are obtainable in the practice of this invention. A helical groove of 7/8-inch pitch cut 1/4-inch deep into a round wood pole of 1 3/8 inches outside diameter, so that the groove root diameter is 7/8-inch, and wound with "Primacord" of a linear velocity of about 22,000 feet per second provides an explosive unit having a detonation velocity of about 6,800 feet per second, measured in the direction of the helical axis. Upon reducing the pitch to 3/4-inch, with a pole and groove of the same dimensions, an axial detonation velocity of about 6,000 feet per second results. Three-quarters of an inch and a pole diameter of 1 3/8 inches appear to be about the minimum pitch and diameter which may be utilized with reliability over a substantial range of conditions. At shallow hole depths and minimum time and depth of submergence in water a pitch of 5/8 inch will give a velocity of about 5,000 feet per second. But when a lower axial velocity than 6,000 feet per second is desired, it is usually preferable to increase the diameter of the pole somewhat. For example, a helical groove with a 3/4-inch pitch and 1 1/8 inches root diameter on a pole of 1 5/8 inches diameter provides a unit axial detonation velocity of about 5,000 feet per second. It is seldom that a lower velocity than this is required.

Poles of these diameter dimensions are substantially smaller and therefore more easily loaded into narrow shot-holes than other types of supporting materials for the explosive-cord helix. Besides protecting the cord from mechanical abrasion and damage by being forced through partial bridges in shot holes, the material between the grooves protects the turns of "Primacord" from mechanically damaging each other. While it might be expected that a small pitch and resulting close spacing of adjacent turns of the "Primacord" helix could result in cross detonation from one turn to the next, with a resulting increase in the apparent detonation velocity along the helical axis, such does not, in fact, appear to be the case. Rather, it appears that mechanical damage of succeeding turns by the shock wave from preceding turns is the danger to be guarded against. Whether the effectiveness in minimizing succeeding turn damage is due to either or both the strength and the compressibility of the wood has not been fully established. Nevertheless, without regard to whether it reduces the shock wave of the detonating cord by absorption or by reflection, or a combination of both, wood has proven a superior material for the cord support.

This is, in part, borne out by the experience obtained in utilizing different types of wood for the rod 11. When a soft wood such as pine is utilized, the absorption of water during prolonged immersion into the pores of the wood between grooves appears to weaken its strength or decrease its compressibility, or both, so that it no longer effectively shields the "Primacord" from mechanical damage to subsequent turns by detonation of preceding ones. This tendency can be effectively overcome by preventing the water infiltration in an efficient manner, such as by impregnating the exposed wood surfaces with a sealing or water-repelling agent, such as molten paraffin wax. On the other hand, when utilizing a harder wood of greater strength and less porosity such as ash, water intrusion and its effect on reducing the strength and/or compressibility of the wood and its isolation of the "Primacord" turns are markedly reduced. Thus, for use as "sleeper" charges in which shot holes are loaded with elongated charges 32 for a substantial period of time before the charges are to be detonated, it is advisable to use either wax-impregnated soft woods or a relatively hard, tough wood, such as ash. Of course, the combination of a hard, dense wood which has also been waterproofed is an optimum for sleeper charges.

As examples of the "Primacord" which have been found useful in this invention, reliable detonation has been obtained utilizing three different strengths or explosive loadings. That is to say, explosive loadings of "Primacord" having 40, 60, and 100 grains of explosive per foot of cord length have been successfully utilized. Taking as a typical example an axial length of fifty feet for the charge 32, this means that for a 6,000 foot per second velocity, a 40-grain "Primacord" loading will provide a total explosive weight of just slightly more than one pound. The 60-grain "Primacord" provides slightly above 1½ pounds, while the 100-grain gives about 2.6 pounds of explosive. For higher effective detonation velocities, such as 7,500 feet per second, for example, the 40-grain "Primacord" provides a total explosive weight of somewhat less than 1 pound, the 60-grain about 1.25 pounds, and the 100-grain slightly more than 2 pounds of explosive total weight. Thus, a main objective of being able to provide low total explosive weights in order to generate high frequencies as well as avoid the generation of large amounts of undesired seismic noise by large explosive charges, is clearly attained. Of course, any greater explosive weight than these minima can be obtained simply by introducing into the "Primacord" column any desired number of supplementary charges 45 at the couplings between the explosive units of the invention.

Figure 9:
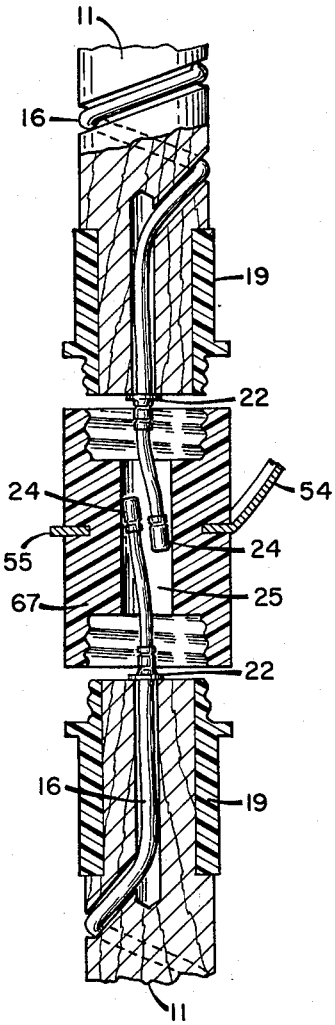

While the foregoing constitutes the presently preferred embodiment of the invention, it should be understood that there are a number of modifications or alternate embodiments that accomplish most of the same objects and may be preferable for particular reasons or in certain circumstances. Thus, as is shown in FIGURE 9, the coupling chamber 25 which maintains close side-by-side contact of the cord tips can be in a separate coupling collar 67. The two ends of the pole unit 11 then employ the same threaded connector 19 and preferably but not necessarily the same length of cord projection. In the case of external threads 20 both here and in FIGURE 1, they can be formed directly on the wood of pole 11 rather than the separately formed coupling 19. While the anchor ring 55 and arms 54 can be used here in the same way as in FIGURE 5, the arms 54 can be anchored directly in collar 67 when it is moulded, or both arms 54 and ring 55 can be so incorporated in the collar.

Figure 10:
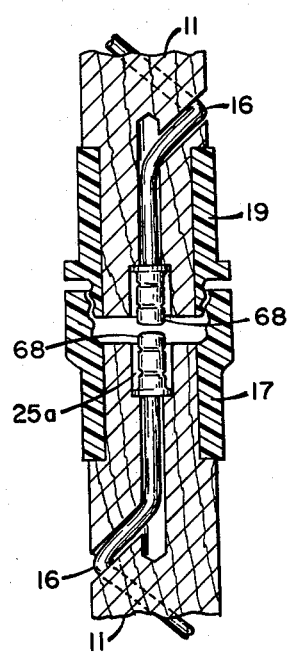
FIGURES 9, 10 and 11 are cross-section views of alternate forms of coupling members.

Side-by-side contact of the cord ends has proven entirely reliable for detonation propagation, but no more so than good end-to-end contact. By carefully regulating the amount of cord-end projection and narrowing the diameter of chamber 25a to be just sufficient to accommodate the cord caps 23 and 24 and/or the flanged collar 21 (or 22), a tight end-to-end contact can be established as in FIGURE 10. The separate flange 21 (or 22) and cap 23 (or 24) can advantageously be a single element of fixed length such as the flanged caps 68 in this figure.

Figure 11:
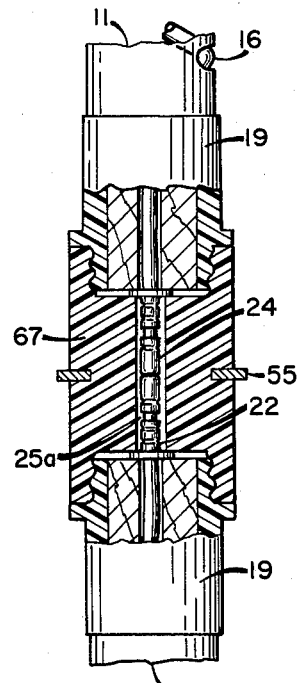

Reliable end-to-end contact can also be provided by a coupling collar arrangement as in FIGURE 9, but with the central opening 25a of smaller diameter, as is shown in FIGURE 11, so that the cord ends are closely confined and cannot avoid meeting when the coupling is tightly joined.

Figure 12:
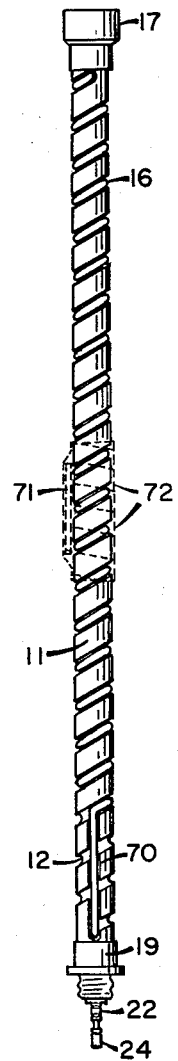
FIGURE 12 is an elevation view of a modified form of the invention.

To provide different effective unit detonation velocities, two of the possible variables are the diameter of the pole 11 and the pitch of groove 12. In this mass production of these units at minimum cost, however, the modification shown in FIGURE 12 may be advantageous. Here, a minimum pole diameter and groove pitch have been chosen to give a desired minimum axial velocity of detonation. Any desired higher velocity is then obtained by effectively by-passing, cutting-out, or "short-circuiting" one or more turns of the explosive helix. For example, before the cord 16 is placed in groove 12, a longitudinal groove 70 may be cut into pole 11 enabling the cord 16 to by-pass some of the helical turns. The groove 70 need not be at the end of the helix as shown, but can be anywhere along the length of the pole 11. It should always terminate at a helical groove, however, so as not to affect the separation of any adjacent cord turns by the wood ridge between the grooves.

The same effect can be provided for a unit which already has its cord 16 in place, by placing a short length 71 of "Primacord" across the turns to be by-passed and holding it in place by a wrapping 72 of waterproof tape.

As an alternative to wax coating, a procedure that has proven very effective in maintaining the cord-turn isolation properties of the wood poles is to wrap the exposed wood surface between connectors 17 and 19 with a waterproof adhesive tape or film. Another is to surround the pole with a thin tubular water-proof plastic jacket sealed at its ends to the plastic connectors. A viscous water-repellant sealing compound applied to threads 18 and/or 20 just prior to joining them very effectively prevents water penetration at the couplings between units. "Sleeper" charges so protected have been detonated reliably after prolonged immersion under quite large hydrostatic pressures.

While the invention has been described with reference to the foregoing preferred embodiment thereof, it is to be understood that other and further modifications will be apparent to those skilled in the art. The scope of the invention, therefore, should not be considered as limited to the details set forth, but is properly to be ascertained from the appended claims.

I claim:

1. A minimum-diameter, rigid explosive unit adapted for coupling to similar units to form an elongated seismic-velocity-matching charge comprising a cylindrical wood rod of at least about 1⅜ inches diameter having a helical groove at about ¼-inch width and at least ⅝-inch pitch and ⅞-inch root diameter extending over its outer surface between two points each near one of the ends of said rod and two openings each extending from said groove at one of said points to the center of the adjacent end of said rod, a high-detonation-velocity detonating cord of substantial explosive power per unit length seated in said groove and passing through said openings, the helix angle of said groove and of said cord seated therein being such as to produce an effective axial detonation velocity between the ends of said rod substantially matching the seismic wave propagation velocity of an earth medium in which said charge is to be detonated, one end of said cord extending substantially to the corresponding end of said rod and the other end of said cord projecting linearly substantially past the other end of said rod along its axis, a male-threaded coupling attached to said other end of said rod, a female-threaded coupling attached to said corresponding end of said rod, there being a cylindrical opening within said female-threaded coupling of about twice the diameter of said cord and an axial depth substantially equal to the length of said projecting cord end to form a chamber which confines the overlapping cord ends of coupled units in close side-by-side detonation-propagating contact, and means to prevent water from entering the pores of said wood so that there is at least a ⅜-inch thickness of strong dry wood shielding each turn of said cord from damage by detonation of an adjacent turn.

2. An explosive unit as in claim 1 in which said groove is in helical form for substantially all of the distance between said two points and including also a length of said cord attached to the outside and extending along said member lengthwise, said cord length terminating at two spaced apart helical turns of said cord seated in said groove.

References Cited in the file of this patent

UNITED STATES PATENTS

| | | |
|---|---|---|
| 2,353,458 | Greene | July 11, 1944 |
| 2,529,763 | Deputy et al. | Nov. 14, 1950 |
| 2,609,885 | Silverman | Sept. 9, 1952 |
| 2,629,325 | Sweetman | Feb. 24, 1953 |
| 2,708,408 | Sweetman | May 17, 1955 |
| 2,755,878 | Smith | July 24, 1956 |
| 2,887,053 | Itria et al. | May 19, 1959 |
| 2,911,909 | Fuchs | Nov. 10, 1959 |
| 2,968,243 | Turechek | Jan. 17, 1961 |
| 2,992,611 | Felch | July 18, 1961 |
| 3,046,886 | Joslin | July 31, 1962 |